United States Patent [19]

Shikatani et al.

[11] Patent Number: 5,120,472
[45] Date of Patent: Jun. 9, 1992

[54] POLYMER COMPOSITIONS

[75] Inventors: Yutaka Shikatani; Seiichi Akita; Nobuyuki Kuroda, all of Kanagawa; Kazuo Matsuura, Tokyo, all of Japan

[73] Assignee: Nippon Oil Company, Japan

[21] Appl. No.: 359,530

[22] Filed: Jun. 1, 1989

[30] Foreign Application Priority Data

Jun. 9, 1988 [JP] Japan .................. 63-140373

[51] Int. Cl.$^5$ ............................. H01B 1/12
[52] U.S. Cl. .................. 252/500; 252/518; 252/519
[58] Field of Search ............... 528/422; 526/256, 589, 526/259; 252/500, 518, 519

[56] References Cited

U.S. PATENT DOCUMENTS 4,565,860 1/1986 Murofushi et al. ............. 528/422

FOREIGN PATENT DOCUMENTS 61-206170 9/1986 Japan .

*Primary Examiner*—Josephine Barr

[57] ABSTRACT

A polymer composition which is superior in processability, exhibits an extremely superior electroconductive characteristic when doped using an electron acceptor, and which comprises, (A) a copolymer represented by the following general formula (I):

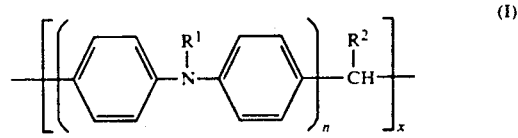

wherein $R^1$ is a hydrogen atom or a hydrocarbon residue having 1 to 20 carbon atoms, $R^2$ is a hydrogen atom, a hydrocarbon residue having 1 to 20 carbon atoms, furyl, pyridyl, nitrophenyl, chlorophenyl, or methoxyphenyl, n and x are each an integer not smaller than 2; and (B) one or more compounds selected from the group consisting of: polypyrrole compounds represented by the following general formula (II):

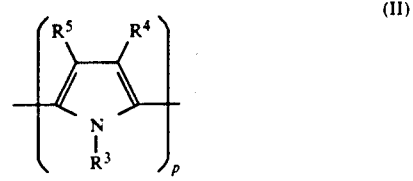

wherein $R^3$, $R^4$ and $R^5$ are each a hydrogen atom or a hydrocarbon residue having 1 to 20 carbon atoms, and p is an integer not smaller than 2; polythiophene compounds represented by the following general formula (III):

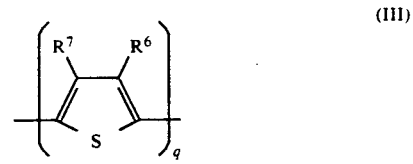

wherein $R^6$ and $R^7$ are each a hydrogen atom or a hydrocarbon residue having 1 to 10 carbon atoms, and q is an integer not smaller than 2, and polyaniline compounds represented by the following general formula (IV):

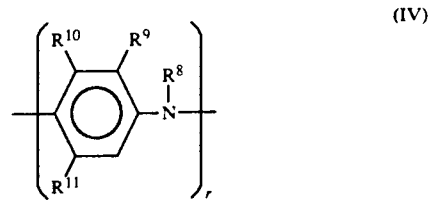

wherein $R^8$, $R^9$, $R^{10}$ and $R^{11}$ are each a hydrogen atom or a hydrocarbon residue having 1 to 10 carbon atoms, and r is an integer not smaller than 2.

3 Claims, 1 Drawing Sheet

POLYMER COMPOSITIONS

BACKGROUND OF THE INVENTION

The present invention relates to a polymer composition and more particularly to a novel polymer composition which is superior in processability and which exhibits an extremely superior electroconductive characteristic when doped using an electron acceptor.

As polymers used for forming electroconductive polymers there are known polyacetylenes, polyparaphenylenes, polythiophenes and polypyrroles. These polymers become employable as electroconductive polymers by being doped using certain kinds of compounds. However, the electroconductive polymers thus obtained are apt to change in quality, especially electrical characteristics, in air. Further, those polymers are poor in meltability and solubility so are extremely inferior in processability. These drawbacks cause a large obstacle to their practical use. For example, as an application of such electroconductive polymers there has been proposed their application to electrodes for a secondary battery utilizing their reversible redox characteristic. In most cases, however, they are unstable physically or chemically in the electrolyte of a secondary battery. Therefore, it is impossible to expect a stable cyclability of charge and discharge which is a basic performance required for a secondary battery. Besides, electroconductive polymers are insoluble and unmeltable because their skeleton is constituted by a $\pi$ electron conjugated system and this point is also a serious obstacle to their practical use. As a solution to these problems it is proposed in Japanese Patent Laid-Open No. 206170/1986 to use an electroactive polymer as an electrode material for a secondary battery which polymer is obtained by doping a polymer having a 4,4'-diphenylamine structure as a repeating unit.

However, the above diphenylamine polymer is an oligomer of a low polymerization degree, lacking in mechanical strength and moldability which the polymer should possess as a high polymer. For example, when this polymer is used as an electrode material of a secondary battery, a soluble component will dissolve out with repetition of charge and discharge, so it is impossible to expect a stable cyclability.

Moreover, in order to impart mechanical strength and moldability to the above diphenylamine polymer in addition to good electrochemical characteristics, it is necessary to obtain a polymer of a higher polymerization degree (a high polymer). But it is difficult to obtain a high polymer even according to any of the processes commonly used for the preparation of polyaromatic compounds or polyheteroaromatic compounds, such as Grignard coupling, oxidative coupling, Friedel-Crafts reaction and electrolytic oxidation polymerization. Even under severer reaction conditions, not only it is impossible to expect the realization of a higher molecular weight due to an induced hetero-linkage or cross-linking reaction, but also the polymer becomes incapable of dissolving and melting with loss in processability which is one of the advantages of high polymers. As a further problem, the polymer becomes inactive electrically.

In order to eliminate the above-mentioned drawbacks of the prior art, the present inventors have previously proposed copolymers of the following general formula (I):

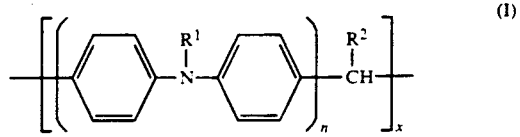

wherein $R^1$ is a hydrogen atom or a hydrocarbon residue having 1 to 20 carbon atoms; $R^2$ is a hydrogen atom, a hydrocarbon residue having 1 to 20 carbon atoms, furyl, pyridyl, nitrophenyl, chlorophenyl, or methoxyphenyl; n and x are each an integer not smaller than 2 (Japanese Patent Application No. 143267/1987).

However, the above copolymer involves the problem that even when doped using an electron accepting compound, they do not become electroconductive sufficiently for use as various electronic materials. Particularly, in their application to battery electrodes, there have been the following problems.

1) Because of poor electroconductivity, the resistance of the electrodes themselves is large, thus making it impossible to handle a large electric current (that is, the charge and discharge current is small).

2) The internal resistance increases and there is no voltage flatness.

3) The charge and discharge capacity is small (that is, the utilization efficiency of active materials is poor).

It is widely known to incorporate carbon black or graphite into the battery electrodes in order to improve the electroconductivity of the electrodes. In this method, however, a large amount of carbon black for example must be used to attain high electroconductivity, resulting in that the amount of active materials of the electrodes becomes smaller and hence the battery capacity is reduced to a remarkable extent.

SUMMARY OF THE INVENTION

It is the object of the present invention to eliminate the above-mentioned drawbacks of the prior art.

Having made further extensive studies on the basis of the foregoing proposal, the present inventors found out that the drawbacks of the prior art could be overcome by using a polymer composition comprising a copolymer of the foregoing general formula (I) and at least one compound mixed with the copolymer which compound is selected from the group consisting of polypyrrole compounds, polythiophene compounds and polyaniline compounds. In this way the present invention was accomplished.

More specifically, the present invention resides in a polymer composition comprising:

(A) a copolymer represented by the following general formula (I):

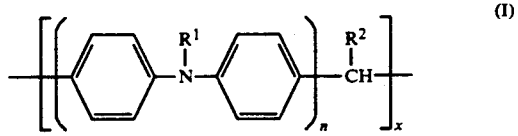

wherein $R_1$ is a hydrogen atom or a hydrocarbon residue having 1 to 20 carbon atoms; $R_2$ is a hydrogen atom, a hydrocarbon residue having 1 to 20 carbon atoms, furyl, pyridyl, nitrophenyl, chlorophenyl, or methoxyphenyl; n and x are each an integer not smaller than 2; and (B) one or more compounds selected from the group consisting of: polypyrrole compounds represented by the following general formula (II):

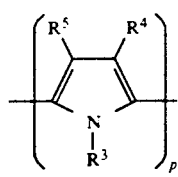

wherein $R^3$, $R^4$ and $R^5$ are each a hydrogen atom or a hydrocarbon residue having 1 to 20 carbon atoms, and p is an integer not smaller than 2; polythiophene compounds represented by the following general formula (III):

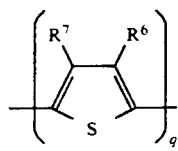

wherein $R^6$ and $R^7$ are each a hydrogen atom or a hydrocarbon residue having 1 to 10 carbon atoms, and q is an integer not smaller than 2; and polyaniline compounds represented by the following general formula (IV):

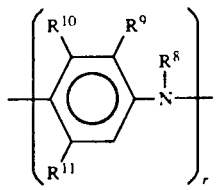

wherein $R^8$, $R^9$ and $R^{11}$ are each a hydrogen atom or a hydrocarbon residue having 1 to 10 carbon atoms, and r is an integer not smaller than 2.

The present invention also resides in an electroconductive polymer composition obtained by doping the above polymer composition using an electron acceptor.

DETAILED DESCRIPTION OF THE INVENTION

The copolymer represented by the general formula (I) in the present invention can be prepared easily by the polycondensation of a polymer having a 4,4'-diphenylamine structure of the following general formula (V) as a repeating unit and an aldehyde of the following general formula (VI) or a polymer thereof:

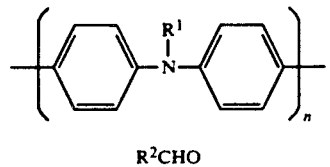

The polymer having a 4,4'-diphenylamine structure of the general formula (V) as a repeating unit can be prepared by a known process such as, for example, an oxidative coupling process or a Grignard coupling process as in Japanese Patent Laid-Open No. 206170/1986 or No. 28524/1986. In the general formula (V), $R^1$ is hydrogen or a hydrocarbon residue having 1 to 20, preferably 1 to 8, carbon atoms. As examples of such hydrocarbon residue are mentioned alkyl groups such as methyl, ethyl, n-propyl, i-propyl, n-butyl, i-butyl and n-hexyl, allyl, aryl groups such as phenyl, tolyl and ethylphenyl, aralkyl, and derivatives thereof. In the same formula, n is not smaller than 2, but usually in the range of 2 to 50, preferably 2 to 30.

As the aldehyde represented by the general formula (VI) there is used a compound of the same formula wherein $R^2$ is hydrogen, a hydrocarbon residue having 1 to 20, preferably 1 to 8, carbon atoms, furyl, pyridyl, nitrophenyl, chlorophenyl, or methoxyphenyl. As examples of such hydrocarbon residue are mentioned alkyl groups such as methyl, ethyl, n-propyl, i-propyl, n-butyl, i-butyl and n-hexyl, allyl, aryl groups such as phenyl, tolyl and ethylphenyl, aralkyl, and derivatives thereof. Typical examples of such aldehyde are formaldehyde, acetaldehyde, propionaldehyde, butylaldehyde, benzaldehyde, acrylaldehyde, cinnamaldehyde, anisaldehyde, nicotinaldehyde, nitrobenzaldehyde, chlorobenzaldehyde and furfural.

"A polymer of the aldehyde" represents a polymer obtained by self-condensation of a concentrated solution of an aldehyde of the general formula (VI) or by condensation of the aldehyde in the presence of an acid catalyst. The said polymer should hydrolyze easily under the reaction conditions for the preparation of the copolymer used in the present invention to produce an aldehyde monomer. Typical examples are paraformaldehyde which is a polymer of formaldehyde and paraaldehyde which is a trimer of acetaldehyde.

The polycondensation of the diphenylamine polymer and the aldehyde can be performed using an acid or alkali catalyst in an organic solvent in which both are soluble, at a temperature in the range of 0° to 200° C. Examples of acid catalysts are inorganic acids such as sulfuric, hydrochloric, phosphoric and perchloric acids, as well as organic acids such as formic, acetic, propionic, methanesulfonic and p-toluenesulfonic acids. Preferred examples of organic solvents include others such as ethyl ether, tetrahydrofuran and dioxane, halogenated hydrocarbons such as chloroform, dichloromethane and chlorobenzene, nitro compounds such as nitrobenzene, as well as acetonitrile, propylene carbonate, dimethylformamide and N-methylpyrrolidone. The reaction time can be selected suitably in the range of 1 minute to 500 hours, preferably 5 minutes to 200 hours.

In the copolymer of the general formula (I) thus obtained, x is not smaller than 2, usually in the range of 2 to 1,000, preferably 5 to 200, and the copolymer substantially has a linear structure.

The copolymer used in the present invention is soluble in such solvents as N-methylpyrrolidone, nitrobenzene and chloroform, but insoluble in alcohols, aliphatic hydrocarbons, as well as acetonitrile and propylene carbonate used in an organic electrolyte type battery. It is a thermoplastic resin capable of being melted by heating, superior in processability and capable of being formed into products of various desired shapes.

The polymer composition of the present invention is obtained by mixing the above copolymer with at least one compound (hereinafter referred to as the "blending compound") selected from polypyrrole compounds, polythiophene compounds and polyaniline compounds.

These blending compounds may be used any one alone or in combination of two or more.

Blending Compound

The polypyrrole compounds in the present invention, represented by the general formula (II), may be used in combination of two or more thereof. In the general formula (II), $R^3$, $R^4$ and $R^5$ are each a hydrogen atom or a hydrocarbon residue having 1 to 2, preferably 1 to 10, carbon atoms. Examples of such hydrocarbon residue include alkyl groups such as methyl, ethyl, n-propyl, i-propyl, n-butyl, i-butyl and sec-butyl, alkoxy groups such as methoxy, ethoxy, n-propoxy, i-propoxy and n-butoxy, aryl groups such as phenyl, toluyl and naphthyl, aryloxy groups such as phenoxy, methylphenoxy and naphthoxy, thioether groups such as methyl thioether and ethyl thioether, and derivatives thereof. In the same general formula, p is an integer not smaller than 2, usually in the range of 2 to 10,000. Both ends of the molecule are each usually a nuclear-substituted hydrogen.

Concrete examples of such polypyrrole compounds are polypyrrole, poly(N-methylpyrrole), poly(N-ethylpyrrole), poly(N-n-propylpyrrole), poly(3-methylpyrrole), poly(3-ethylpyrrole), poly(3-methyl-N-methylpyrrole), poly(3-ethyl-N-methylpyrrole), poly(3-methoxypyrrole), poly(3-ethoxypyrrole), poly(3-methoxy-N-methylpyrrole), poly(3-ethoxy-N-ethylpyrrole), poly(3-phenylpyrrole), poly(3-phenyl-N-methylpyrrole), poly(3-phenoxypyrrole), poly(3-naphthoxypyrrole), poly(3-methylthiopyrrole), poly(3-ethylthiopyrrole), poly(3,4-dimethylpyrrole) and poly(3,4-diethyl-N-methylpyrrole).

The polythiophenyl compounds in the present invention, represented by the general formula (III), may be used in combination of two or more thereof. In the general formula (III), $R^6$ and $R^7$ are each a hydrogen atom or a hydrocarbon residue having 1 to 20, preferably 1 to 10, carbon atoms. Examples of such hydrocarbon residues include alkyl groups such as methyl, ethyl, n-propyl, i-propyl, n-butyl, i-butyl and sec-butyl, alkoxy groups such as methoxy, ethoxy, n-propoxy, i-propoxy and n-butoxy, aryl groups such as phenyl, toluyl and naphthyl, aryloxy groups such as phenoxy, methylphenoxy and naphthoxy, and derivatives thereof. In the same general formula, q is an integer not smaller than 2, but usually in the range of 2 to 10,000. Both ends of the molecule are each usually a nuclear-substituted hydrogen.

Concrete examples of such polythiophene compounds are polythiophene, poly(3-methylthiophene), poly(3-ethylthiophene), poly(3-n-propylthiophene), poly(3-i-propylthiophene), poly(3-n-butylthiophene), poly(3-i-butylthiophene), poly(3-sec-butylthiophene), poly(3-methoxythiophene), poly(3-ethoxythiophene), poly(3-n-propoxythiophene), poly(3-i-propoxythiophene), poly(3-n-butoxythiophene), poly(3-phenylthiophene), poly(3-toluylthiophene), poly(3-naphthylthiophene), poly(3-phenoxythiophene), poly(3-methylphenoxythiophene), poly(3-naphthoxythiophene), poly(3,4-dimethylthiophene) and poly(3,4-diethylthiophene).

The polyaniline compounds in the present invention, represented by the general formula (IV), may be used in combination of two or more thereof. In the same general formula, $R^8$, $R^9$, $R^{10}$ and $R^{11}$ are each a hydrogen atom or a hydrocarbon residue having 1 to 20, preferably 1 to 10, carbon atoms. Examples of such hydrocarbon residues include alkyl groups such as methyl, ethyl, n-propyl, i-propyl, n-butyl, i-butyl and sec-butyl, alkoxy groups such as methoxy, ethoxy, n-propoxy, i-propoxy and n-butoxy, aryl groups such as phenyl, toluyl and naphthyl, aryloxy groups such as phenoxy, methylphenoxy and naphthoxy. In the same general formula, r is an integer not smaller than 2, but usually in the range of 2 to 10,000. Both ends of the molecule are each usually a nuclear-substituted hydrogen.

Concrete examples of such polyaniline compounds are polyaniline, poly(3-methylaniline), poly(3,5-dimethylaniline), poly(3-ethylaniline), poly(3-n-propylaniline), poly(3-methoxyaniline), poly(3,5-dimethoxyaniline), poly(3-ethoxyaniline), poly(3,5-diethoxyaniline), poly(3-phenylaniline), poly(3,5-diphenylaniline), poly(3-naphthylaniline), poly(3-toluylaniline), poly(2,5-dimethylaniline), poly(3-phenoxyaniline), poly(3-naphthoxyaniline), poly(N-methylaniline), poly(N-ethylaniline), poly(3-methyl-N-methylaniline), poly(3,5-dimethyl-N-ethylaniline), poly(3-ethyl-N-methylaniline), poly(3-methoxy-N-methylaniline), poly(3,5-methoxy-N-methylaniline) and poly(3-phenoxy-N-methylaniline).

Mixing of the Copolymer with the Blending Compound

The polymer composition of the present invention is obtained by uniformly dispersing and incorporating the blending compound in the copolymer of the general formula (I). As the blending compound to be mixed with the copolymer of the general formula (I), there may be used one blending compound or two or more blending compounds. Further, a conventional electroconductivity assistant such as, for example, carbon black or graphite may be incorporated in the mixture.

The mixing ratio of the copolymer of the general formula (I) and the blending compound(s) is 1–400 parts by weight, preferably 5–100 parts by weight, of the blending compound(s) for 100 parts by weight of the copolymer.

The mixing method is not specially limited. Any known method may be used; for example, a method utilizing the feature of the copolymer of the general formula (I) that the copolymer is soluble in such solvents as N-methylpyrrolidone, nitrobenzene, chloroform and sulfuric acid as previously noted, wherein the copolymer is dissolved in any such solvent, then the blending compound(s) is added and dispersed uniformly, both are mixed together and thereafter dried to obtain a polymer composition, or a method wherein the copolymer of the general formula (I) is heat-melted, then the blending compound(s) is added and dispersed uniformly, both are mixed together and cooled to obtain a polymer composition, or a method wherein the copolymer of the general formula (I) and the blending compound(s) are directly mixed together in a solid phase by ball milling or any other suitable means.

There also may be adopted a method wherein the blending compound(s) is added in the form of not polymer but a monomer of a pyrrole compound, a thiophene compound or an aniline compound, to the copolymer of the general formula (I) and polymerizatio is allowed to take place in solid, liquid, or vapor phase, preferably in liquid phase with the copolymer dissolved therein, in the presence of a metal salt having a strong acid residue, halogen or cyano, a peroxide, or a nitrogen oxide.

Doping

The polymer composition of the present invention exhibits high electroactivity by being doped using an electron acceptor as dopant and permits a redox reaction to be performed in good repeatability. Besides, because of high electroconductivity, it is employable in various electronic devices. For example, when it is used as an electrode material of a secondary battery, it is possible to effect reversible charge and discharge. Even when the number of repetitions (the number of cycles) of charge and discharge is increased, there can be obtained extremely stable characteristics without the occurrence of such a dissolving-out phenomenon as is induced in the use of a diphenylamine polymer and the resulting deterioration of cyclability. Further, the polymer composition of the invention permits handling of a large charge and discharge current and attains good voltage flatness during charge and discharge. Additionally, the blending compound plays the role of an electroconductivity assistant and per se conducts a reversible redox reaction; as a result, there can be obtained excellent effects, for example the capacity for each active electrode material is not lowered.

As examples of electron accepting dopants are mentioned iodine, bromine, halides such as hydrogen iodide, metal halides such as arsenic pentafluoride, phosphorus pentachloride, phosphorus pentafluoride, antimony pentafluoride, silicon tetrafluoride, aluminum chloride, aluminum bromide, aluminum fluoride and ferric chloride, protic acids such as sulfuric, nitric and chlorosulfonic acids, oxidants such as sulfur trioxide and difluorosulfonyl peroxide, and organic materials such as tetracyanoquinodimethane. As examples of dopants which permit electrochemical doping there are mentioned anions such as halide anions of V-A Group elements, e.g. $PF_6^-$, $SbF_6^-$ and $AsF_6^-$, halide anions of III-A Group elements, e.g. $BF_4^-$, halogen anions, e.g. $I^-(I_8^-)$, $Br^-$ and $Cl^-$, and perchloric acid anions, e.g. $ClO_4^-$.

Doping is performed in a known manner. Typically, when the electron accepting dopant is gas or has a vapor pressure, there may be adopted a vapor phase doping method wherein the polymer composition is exposed into the vapor atmosphere of the dopant; or a wet doping method wherein the polymer composition is immersed in a solution of the electron accepting dopant in an inert solvent; or a method wherein where the polymer composition is dissolved in a solution of the electron accepting compound in an inert solvent, film or coating is formed from the said solution by a dry film forming method and at the same time doping is performed; or a method wherein the polymer composition is immersed in a solution with the dopant present therein, then an electric field is induced therein to effect an electrochemical doping.

The doping in the present invention may be performed for the polymer composition as the final product, or for the copolymer of the general formula (I) and the blending compound separately prior to mixing of the two.

Further, the polymer composition of the present invention has the property that when it is doped using an anion, the nitrogen atom in the copolymer of the general formula (I) as a constituent of the composition bears a positive charge and affords a stable state. Therefore, it is stable to the repetition of oxidation and reduction, highly electroconductive and superior in processability. These characteristics are utilized to constitute various functional electrodes of batteries, etc. More specifically, such electrodes can be constituted by dissolving the copolymer of the general formula (I) in a solvent, then adding the blending compound(s), followed by molding, or by heat-melting and molding the polymer composition of the present invention, or by pressure molding using the polymer composition as a main component, or by the use of a binder. As the binder there may be used, for example, polytetrafluoroethylene, polyvinylidene fluoride, polyvinyl chloride, or polyethylene, provided that the binder is not always limited to those just exemplified.

The polymer composition of the present invention is also employable as a photoconductive material because it has diphenylamine units effective as a photoconductive.

Effects of the Invention

Since the polymer composition of the present invention contains a linear copolymer as an essential component, it is superior in processability and can easily afford various formed products. Moreover, an extremely high electroconductivity can be developed by doping the polymer composition of the present invention using an electron acceptor. Besides, the doping is reversible and an extremely high cyclability is ensured. Thus, the polymer composition of the invention is also very superior as an electroconductive polymer composition.

The following Example is given to illustrate the present invention more concretely, but the invention is not limited thereto.

EXAMPLE 1

Preparation of N-Methyldiphenylamine Polymer 50.0 g of anhydrous $FeCl_3$ was placed in a three-necked, 300-ml flask and dissolved by addition of 150 ml ethanol, then 18.4 g of N-methyldiphenylamine was added and reaction was allowed to take place at room temperature in a nitrogen atmosphere for 24 hours under stirring. After the reaction, the resulting precipitate of bluish green was filtered, then washed with ethanol and ion-exchanged water, thereafter washed again with ethanol and then dried to yield 12.1 g of blue solids.

The solids thus obtained were dissolved in 200 ml of dichloromethane and then filtered. The filtrate was recovered and the dichloromethane removed, followed by drying to afford 11.6 g of an N-methyldiphenylamine polymer soluble in dichloromethane.

The mass spectrometric analysis was conducted to find main peaks at mass numbers of 364 and 545 which show that the polymer is a mixture of oligomers having molecular weight of 2 and 3. The polymer was measured for infrared spectrum to find an absorption at 820 $cm^{-1}$ due to para-substituted benzene which demonstrates that the polymer has a structure in which N-methyldiphenylamine molecules are linked at the para-positions of the phenyl groups thereof.

Polycondensation of the N-Methyldiphenylamine Polymer and Propionaldehyde 2.0 g of the N-methyldiphenylamine polymer prepared above was placed in a three-necked, 300-ml flask and dissolved in 40 ml of 1,4-dioxane. Then, 0.5 ml of concentrated sulfuric acid and 0.38 g of propionaldehyde dissolved in 20 ml of 1,4-dioxane were added dropwise and thereafter reaction was allowed to take place at 85° C. for 3 hours under stirring. After the reaction, the reaction solution was poured into 200 ml of ethanol and the resulting precipitate was filtered, washed with acetonitrile and then dried to yield 0.73 g of a blue polymer. The polymer was soluble in N- methylpyrrolidone and nitrobenzene and insoluble in acetonitrile, propylene carbonate and aliphatic hydrocarbons.

Preparation of Pyrrole Polymer 50 0 g of FeCl$_3$ was placed in a three-necked, 300-ml flask and dissolved by the addition of 100 ml ethanol, then cooled to 0° C., to which was then added 2 ml of pyrrole, and reaction was allowed to take place at 0° C. for 1 hour under stirring. After the reaction, the resulting precipitate of a blackish blue color was filtered, washed with ethanol and ion-exchanged water, then dried to obtain 1.5 g of a fine particulate pyrrole polymer.

The pyrrole polymer thus obtained was pressed in the form of a disc by means of a tablet forming apparatus and the disc thus formed was measured for electroconductivity according to a four probe method, which was found to be 54 SS/cm at room temperature.

Preparing Polymer Composition by Mixing the Copolymer with the Pyrrole Polymer 0.50 g of the copolymer prepared by the polycondensation of the N-methyldiphenylamine polymer and the propionaldehyde was dissolved in 10 ml of chloroform, then 0.20 g of the pyrrole polymer was added and stirring was made to prepare a solution of the copolymer with the pyrrole polymer dispersed therein uniformly. This copolymer solution containing the pyrrole polymer was cast onto a Teflon plate and dried to obtain a uniform film having a thickness of 20 μm. The film was flexible and found to have an electroconductivity of 0.2 S/cm according to a four probe method.

Using this film as a positive electrode, a platinum sheet as a counter electrode, Ag/AgNO$_3$ as a reference electrode and a 0.7M-Et$_4$NPF$_6$ solution in acetonitrile as electrolyte, there was conducted a half cell charge-discharge text. Charge-discharge cyclability was checked under the conditions of an amount of charge of 104 c/g and a charge-discharge current of 5 mA/cm$^2$; as a result, there was obtained a stable cyclability of over 100 times at a Coulomb efficiency of not less than 95%. FIG. 1 shows a discharge curve, in which the amount of discharge load is plotted along the axis of abscissa and a discharge potential based on Ag/AgNO$_3$ is plotted along the axis of ordinate. It turned out that an extremely good potential stability was exhibited even at a current density as high as 5 mA/cm$^2$.

EXAMPLE 2

Preparation of N-Methyldiphenylamine Polymer 15.0 g of anhydrous FeCl$_3$ was placed in a three-necked, 300-ml flask and dissolved by addition of 100 ml diethyl ether, then 5.0 g of N-methyldiphenylamine was added and reaction was allowed to take place in a nitrogen atmosphere for 1 hour under stirring while cooling with ice. After the reaction, the resulting with ethanol and ion-exchanged water, thereafter washed again with ethanol and then dried to yield 3.8 g of greenish white solids.

The solids thus obtained were dissolved in 100 ml of dichloromethane and then filtered. The filtrate was recovered and the dichloromethane removed, followed by drying to afford 3.1 g of an N-methyldiphenylamine polymer soluble in dichloromethane. The product was found to be a dimer of N-methylphenylamine by mass analysis.

Polycondensation of the N-Methyldiphenylamine Polymer and Paraaldehyde 2.0 g of the N-methyldiphenylamine polymer prepared above was placed in a three-necked, 300-ml flask and dissolved in a mixed solvent of 45 ml of nitrobenzene and 15 ml of acetic acid. Then, 0.5 ml of concentrated sulfuric acid and 0.40 g of paraaldehyde were added dropwise and thereafter reaction was allowed to take place at 80° C. for 3 hours under stirring. After the reaction, the reaction solution was poured into 200 ml of ethanol and the resulting precipitate was filtered, washed with acetonitrile and then dried. The obtained grayish white solids were solved in chloroform, precipitated in ethanol and dried to yield 1.4 g of a polymer. The polymer was soluble in N-methylpyrrolidone and nitrobenzene and insoluble in acetonitrile, propylene carbonate and aliphatic hydrocarbons.

Preparation of Thiophene Polymer 30.0 g of molybdenum (V) chloride was placed in a three-necked, 300-ml flask and dissolved by the addition of 100 ml ion-exchanged water, to which was then added 4 ml of thiophene, and reaction was allowed to take place at room temperature for 10 hour under stirring. After the reaction, the resulting precipitate was filtered, washed with ethanol and ion-exchanged water, then dried to obtain 3.0 g of a fine particulate thiophene polymer.

The thiophene polymer thus obtained was pressed in the form of a disc by means of a tablet forming apparatus and the disc thus formed was measured for electroconductivity according to a four probe method, which was found to be 10 S/cm at room temperature. Preparing Polymer Composition by Mixing the Copolymer with the Thiophene Polymer 0.50 g of the copolymer prepared by the polycondensation of the N-methyldiphenylamine polymer and the paraaldehyde was dissolved in 10 ml of chloroform, then 0.20 g of the thiophene polymer was added and stirring was made to prepare a solution of the copolymer with the thiophene polymer dispersed therein uniformly. This copolymer solution containing the thiophene polymer was cast onto a Teflon plate and dried to obtain a uniform film having a thickness of 20 um. The film was flexible and found to have an electroconductivity of 0.1 S/cm according to a four probe method.

Using this film as a positive electrode, a platinum sheet as a counter electrode, Ag/AgNO$_3$ as a reference electrode and a 0.7M-Et$_4$MPF$_6$ solution in acetonitrile as electrolyte, there was conducted a half cell charge-discharge text. Charge-discharge cyclability was checked under the conditions of an amount of charge of 104 c/g and a charge-discharge current of 5 mA/cm$^2$; as a result, there was obtained a stable cyclability of over 100 times at a Coulomb efficiency of not less than 95%.

EXAMPLE 3

Preparation of N-Methyldiphenylamine Polymer 50.0 g of anhydrous FeCl$_3$ was placed in a three-necked, 300-ml flask and dissolved by addition of 15 ml ethanol and 150 ml of benzene, then 18.4 g of N-methyldiphenylamine was added and reaction was allowed to take place at room temperature in a nitrogen atmosphere for 24 hours under white stirring. After the reaction, the resulting precipitate of grayish white was filtered, then washed with ethanol and ion-exchanged water, thereafter washed again with ethanol and then dried to yield 10.2 g of blue solids.

The solids thus obtained were dissolved in 200 ml of dichloromethane and then filtered. The filtrate was recovered and the dichloromethane removed, followed by drying to afford 8.7 g of an N-methyldiphenylamine polymer soluble in dichloromethane. The polymer was found to be mainly a pentadecamer of N-methyldiphenylamine by mass analysis.

Polycondensation of the N-Methyldiphenylamine Polymer and Propionaldehyde 2.0 g of the N-methyldiphenylamine polymer prepared above was placed in a three-necked, 300-ml flask and dissolved in 50 ml of nitrobenzene. Then, 0.5 ml of p-toluene sulfonic acid and 0.38 g of propionaldehyde were added dropwise and thereafter reaction was allowed to take place at 80° C. for 3 hours under stirring. After the reaction, the reaction solution was poured into 200 ml of ethanol and the resulting precipitate was filtered, washed with acetonitrile. The obtained grayish white solids were dissolved in chloroform, precipitated in ethanol and then dried to yield 1.0 g of a polymer. The polymer was soluble in N-methylpyrrolidone and nitrobenzene and insoluble in acetonitrile, propylene carbonate and aliphatic hydrocarbons.

Preparation of a Composite of the Copolymer and an Aniline Polymer by Electrolysis Polymerization A solution of the copolymer obtained by polycondensation of the N-methyldiphenylamine polymer and propionaldehyde in chloroform was cast on a platinum sheet and dried to form a thin film of the copolymer on the platinum sheet.

The copolymer-coated platinum sheet was immersed in an aqueous solution of 2M-perchloric acid containing 1M concentration of aniline and anodic oxidation was carried out to form an aniline polymer on the thin film of the copolymer. The weight ratio of the copolymer to the aniline polymer is 2 to 1.

Using this composite as a positive electrode, a platinum sheet as a counter electrode, Ag/AgNO$_3$ as a reference electrode and a 0.7M-Et$_4$NPF$_6$ solution in acetonitrile as electrolyte, there was conducted a half cell charge-discharge text. Charge-discharge cyclability was checked under the conditions of an amount of charge of 104 c/g and a charge-discharge current of 5 mA/cm$^2$, as a result, there was obtained a stable cyclability of over 100 times at a Coulomb efficiency of not less than 95%.

Figure 1:
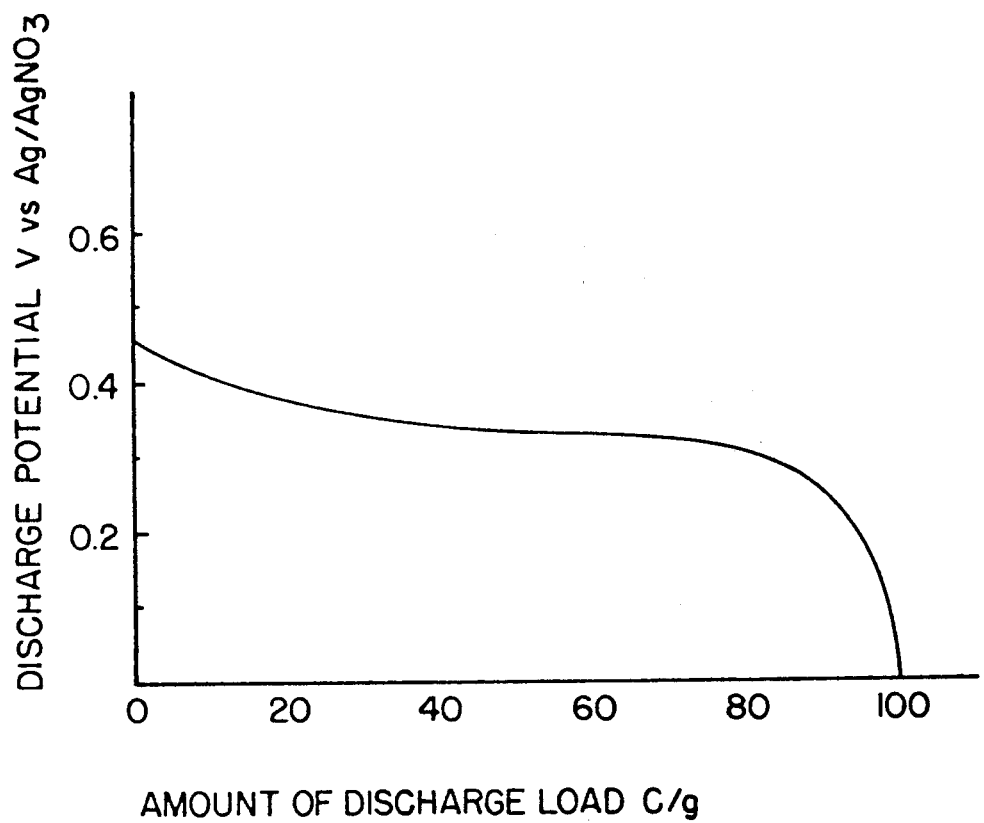
FIG. 1 is a diagram showing an example of a discharge curve of the polymer composition of the present invention.

What is claimed is:

1. A polymer composition comprising:
(A) 100 parts by weight of a copolymer represented by the following general formula (I):

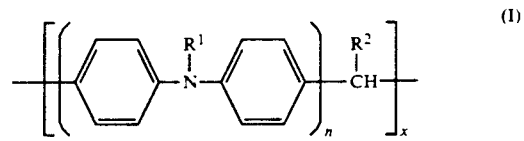

wherein $R^1$ is a hydrogen atom or a hydrocarbon residue having 1 to 20 carbon atoms; $R^2$ is a hydrogen atom, a hydrocarbon residue having 1 to 20 carbon atoms, furyl, pyridyl, nitrophenyl, chlorophenyl or methoxyphenyl; n is an integer of 2 to 50; and x is an integer of 2 to 1,000; and (B) 1 to 400 parts by weight of one or more compounds selected from the group consisting of: polypyrrole compounds represented by the following general formula (II):

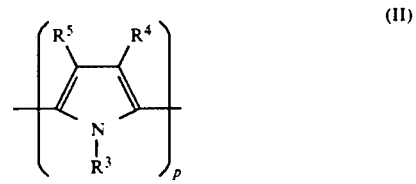

wherein $R^3$, $R^4$ and $R^5$ are each a hydrogen atom or a hydrocarbon residue having 1 to 20 carbon atoms, and p is an integer not less than 2; polythiophene compounds represented by the following general formula (III):

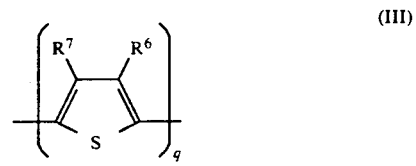

wherein $R^6$ and $R^7$ are each a hydrogen atom or a hydrocarbon residue having 1 to 10 carbon atoms and q is an integer not less than 2; and polyaniline compounds represented by the following general formula (IV):

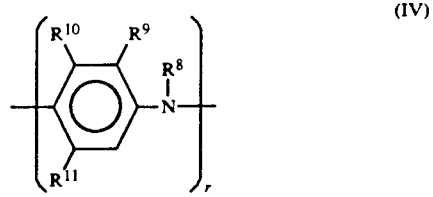

wherein $R^8$, $R^9$, $R^{10}$ and $R^{11}$ are each a hydrogen atom or a hydrocarbon residue having 1 to 10 carbon atoms and r is an integer not less than 2.

2. A polymer composition as set forth in claim 1, wherein the amount of said component (B) is in the range of 5 to 100 parts by weight for 100 parts by weight of said component (A).

3. An electroconductive polymer composition obtained by doping the polymer composition of claim 1 using an electron acceptor as the dopant.

* * * * *